(12) United States Patent
Ohwa

(10) Patent No.: US 8,849,040 B2
(45) Date of Patent: Sep. 30, 2014

(54) IMAGE COMBINING APPARATUS

(75) Inventor: Yasushi Ohwa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 13/484,618

(22) Filed: May 31, 2012

(65) Prior Publication Data

US 2012/0314958 A1 Dec. 13, 2012

(30) Foreign Application Priority Data

Jun. 10, 2011 (JP) .................................. 2011-130169

(51) Int. Cl.
*G06K 9/48* (2006.01)
*H04N 5/232* (2006.01)
*G06T 5/50* (2006.01)

(52) U.S. Cl.
CPC ......... *G06T 5/50* (2013.01); *G06T 2207/20201* (2013.01); *H04N 5/23254* (2013.01); *H04N 5/23219* (2013.01); *G06T 2207/20212* (2013.01); *H04N 5/23277* (2013.01)
USPC .......................................................... 382/197

(58) Field of Classification Search
None
See application file for complete search history.

(56) References Cited

FOREIGN PATENT DOCUMENTS

JP 08-251474 9/1996
JP 2009-188837 8/2009

*Primary Examiner* — Stephen R Koziol
*Assistant Examiner* — Amandeep Saini
(74) *Attorney, Agent, or Firm* — Cowan, Liebowitz & Latman, P.C.

(57) ABSTRACT

An image combining apparatus obtains information of an object area upon photographing of images, executes a preparation operation preceding to the photographing on the basis of the obtained information, measures an elapsed time from the preparation operation to a photographing instruction, divides each of the photographed images into a plurality of areas, detects a motion vector of each divided area, weights the detected motion vector by using the elapsed time and the information of the object area, and calculates a position adjustment vector by using the weighted motion vector.

9 Claims, 16 Drawing Sheets

WEIGHTINGS OF MOTION VECTOR

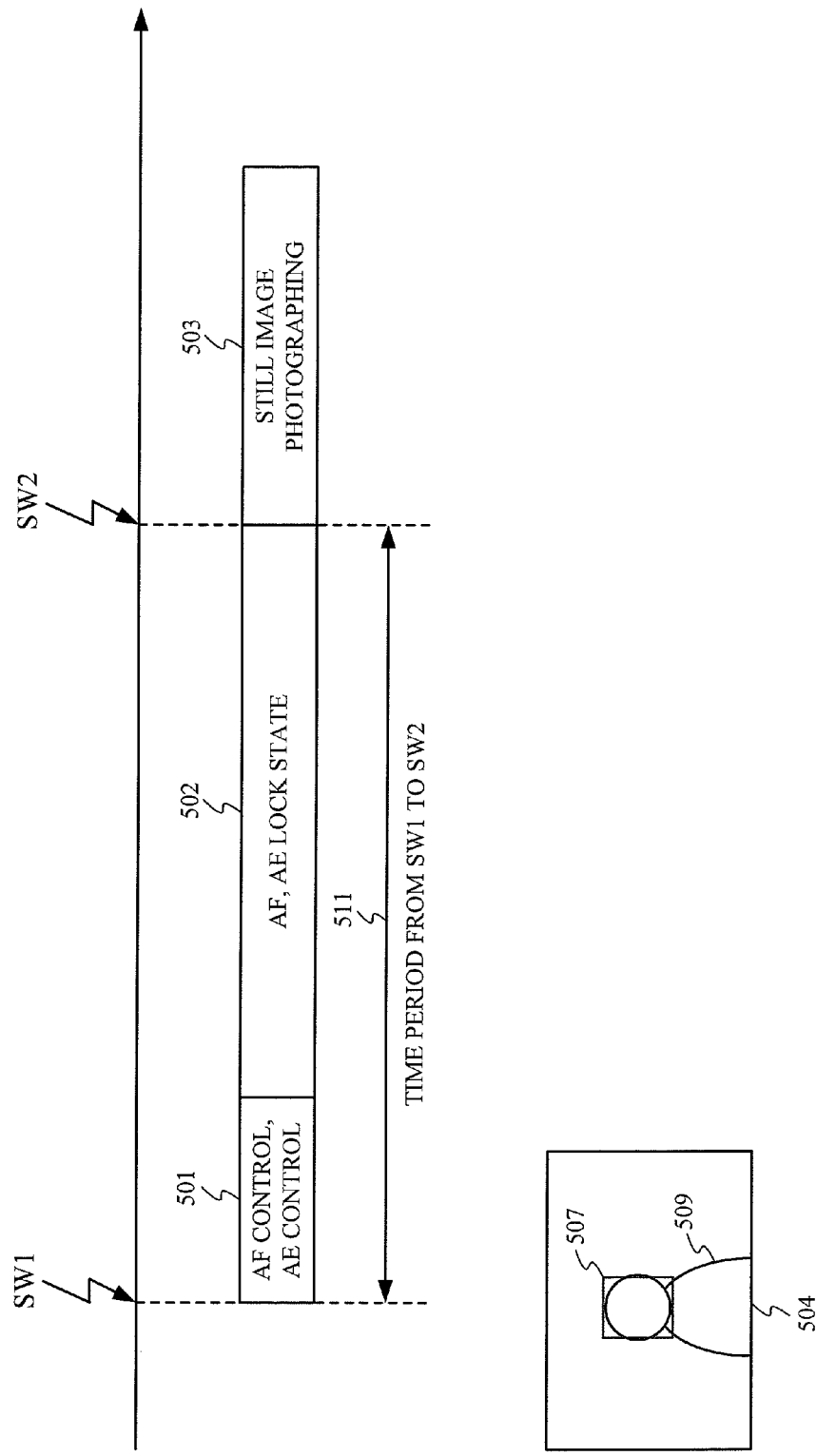

FIG. 13

| PHOTOGRAPHING MODE / MAIN OBJECT | PORTRAIT | NIGHT SCENE | LANDSCAPE | SPORTS |
|---|---|---|---|---|
| PERSON/FACE | $\dfrac{k}{Tv}$ | $\dfrac{k}{Tv}$ | $\dfrac{k}{Tv}$ | $\dfrac{k}{2Tv}$ |
| SPOT AF | $\dfrac{k}{Tv}$ | $\dfrac{2k}{Tv}$ | $\dfrac{2k}{Tv}$ | $\dfrac{k}{2Tv}$ |
| MULTI-POINT AF (N-POINT IN-FOCUS) | $\dfrac{Nk}{Tv}$ | $\dfrac{2Nk}{Tv}$ | $\dfrac{4Nk}{Tv}$ | $\dfrac{Nk}{2Tv}$ |

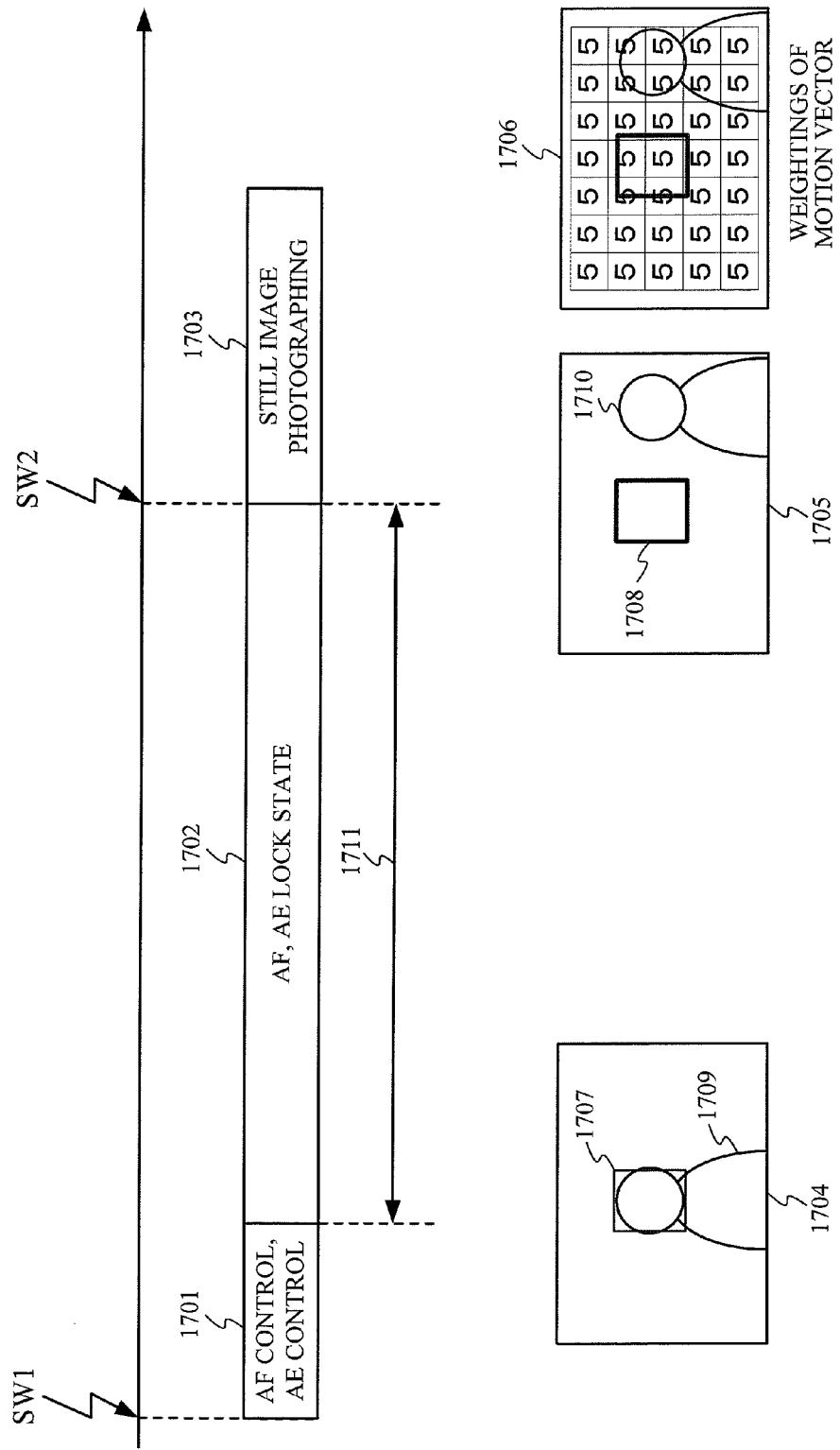

IMAGE COMBINING APPARATUS

BACKGROUND OF THE INVENTION

1. Field of the Invention

The present invention relates to an image combining apparatus for combining a plurality of photographed images by adjusting positions thereof.

2. Description of the Related Art

In recent years, in the case of combining a plurality of photographed images, as a method of detecting a motion vector of the image for a correction of image blurring or the like, a block matching method or a correlation method based on a correlation operation has been known. According to the block matching method, an image signal which is input is divided into a plurality of blocks each having a proper size (for example, 8 pixels×8 lines) and a difference of a pixel value between a current field (or frame) and a previous field is calculated on this block basis. A block of the previous field having a higher correlation to a block of the current field is searched for on the basis of the difference, and a motion vector of the block is obtained as a relative positional difference between images.

For example, each of the Official Gazettes of Japanese Patent Application Laid-Open Nos. H08-251474 and 2009-188837 discloses a selecting method of a motion vector and a weighting method. The Official Gazette of Japanese Patent Application Laid-Open No. H08-251474 discloses a selecting method of a representative motion vector (motion vector of the whole image) based on an index such as a size of an image area or vector stability. The Official Gazette of Japanese Patent Application Laid-Open No. 2009-188837 discloses a method of detecting an object area and calculating such a motion vector (correction vector) as to reduce a blurring of a main object (object to be photographed) in consideration of importance of the main object.

In the related art, in the case of combining a plurality of photographed images, first, a motion vector is detected in a predetermined area of an image in order to make a correction of the image blurring or the like, the detected motion vector is weighted, and a vector for position adjustment is generated by combining the weighted motion vectors. As a weighting in this case, a weighting corresponding to features of an image area or to an object area in which the object is detected is used.

Upon photographing, a detection of the object, focus control, proper exposure control, and the like are performed in accordance with the operation (for example, half-depression) of a first shutter switch which is executed by the operator, and the main photographing is performed in accordance with the operation (for example, full-depression) of a second shutter switch. In this case, generally, information such as object position of the photographed image, features of the object, and the like is obtained when the operator operates the first shutter switch to lock the object.

FIGS. 1 and 2 are diagrams for explaining a relation between a generation of weightings of a motion vector by the method of the related art and the operations of the first and second shutter switches.

When the operator operates the first shutter switch, AF control and AE control (101, 201) are performed and an object lock (102, 202) (AF, AE lock state) is obtained. Subsequently, when the operator operates the second shutter switch, a still image photographing (103, 203) is performed. At this time, an elapsed time from the operation of the first shutter switch is denoted with the numerals 111 and 211. A photographing angle of view at a point of time of the operation of the first shutter switch is denoted with the numerals 104 and 204. An object (109, 209) and a detected object area (107, 207) are shown. The detected object area (107, 207) is, for example, a main object area detected at the time of the AF control or AE control. A photographing angle of view at a point of time of the operation of the second shutter switch and the object lock (102, 202) is denoted with the numerals 105 and 205. An actual object at this time is denoted with the numerals 110 and 210 and a detected object area is denoted with the numerals 108 and 208. A weighting table of the motion vector for position adjustment at the time of combination is denoted with the numerals 106 and 206. In the table, the larger a numeral is, the larger a weighting of the motion vector in this area is. The smaller a numeral is, the smaller a weighting becomes. The weighting table (106, 206) is generated on the basis of object information (position, size, features, and the like) at the point of time of the object lock (102, 202) and the larger weighting is applied to the object area.

When the elapsed time (lock state) from the operation of the first shutter switch to the operation of the second shutter switch is short as shown in the time 111, it is considered that the object 109 exists at almost the same position as that of the actual object 110 and is not so moved even after the elapse of time 111. Therefore, the weighting table 206 which is generated properly corresponds to the position of the actual object 110. However, when the elapsed time (lock state) from the operation of the first shutter switch to the operation of the second shutter switch is long as shown in the time 211, there is such a case where the object 209 is moved to the position of the actual object 210 after the elapse of time 211. In such a case, there is such a problem that the generated weighting table 206 of the motion vector which is generated does not properly correspond to the position of the actual object 210.

SUMMARY OF THE INVENTION

According to an aspect of the present invention, an image combining apparatus for combining a plurality of photographed images by adjusting positions thereof in accordance with a position adjustment vector, comprises: an object area obtaining unit configured to obtain information of an object area the images to be photographed; a preparation operation control unit configured to execute a preparation operation preceding to the photographing on the basis of the information obtained by the object area obtaining unit; an elapsed time obtaining unit configured to measure and obtain an elapsed time from the preparation operation executed by the preparation operation control unit to a photographing instruction; a motion vector detection unit configured to divide each of the photographed images into a plurality of areas and detect a motion vector of each of the divided areas; a motion vector weighting unit configured to weight the detected motion vector by using the elapsed time and the information of the object area; and a position adjustment vector calculation unit configured to calculate the position adjustment vector by using the weighted motion vector.

Further features of the present invention will become apparent from the following description of exemplary embodiments with reference to the attached drawings.

BRIEF DESCRIPTION OF THE DRAWINGS

FIG. 5 is a diagram for explaining a relation between the elapsed time from the operation of the first shutter switch to the operation of the second shutter switch and a photographing processing according to the invention.

FIG. 13 is a diagram for explaining an example of a method of obtaining a threshold value T0 of the elapsed time.

FIG. 17 is a diagram for explaining another example of a weighting table of the invention which is generated in the case where the elapsed time from the operation of the first shutter switch to the operation of the second shutter switch is long.

DESCRIPTION OF THE EMBODIMENTS

Exemplary embodiments of the invention will be described hereinbelow with reference to the drawings.

The embodiments relate to an example in which the invention is applied to an image pickup apparatus such as a digital camera or the like.

Figure 1:
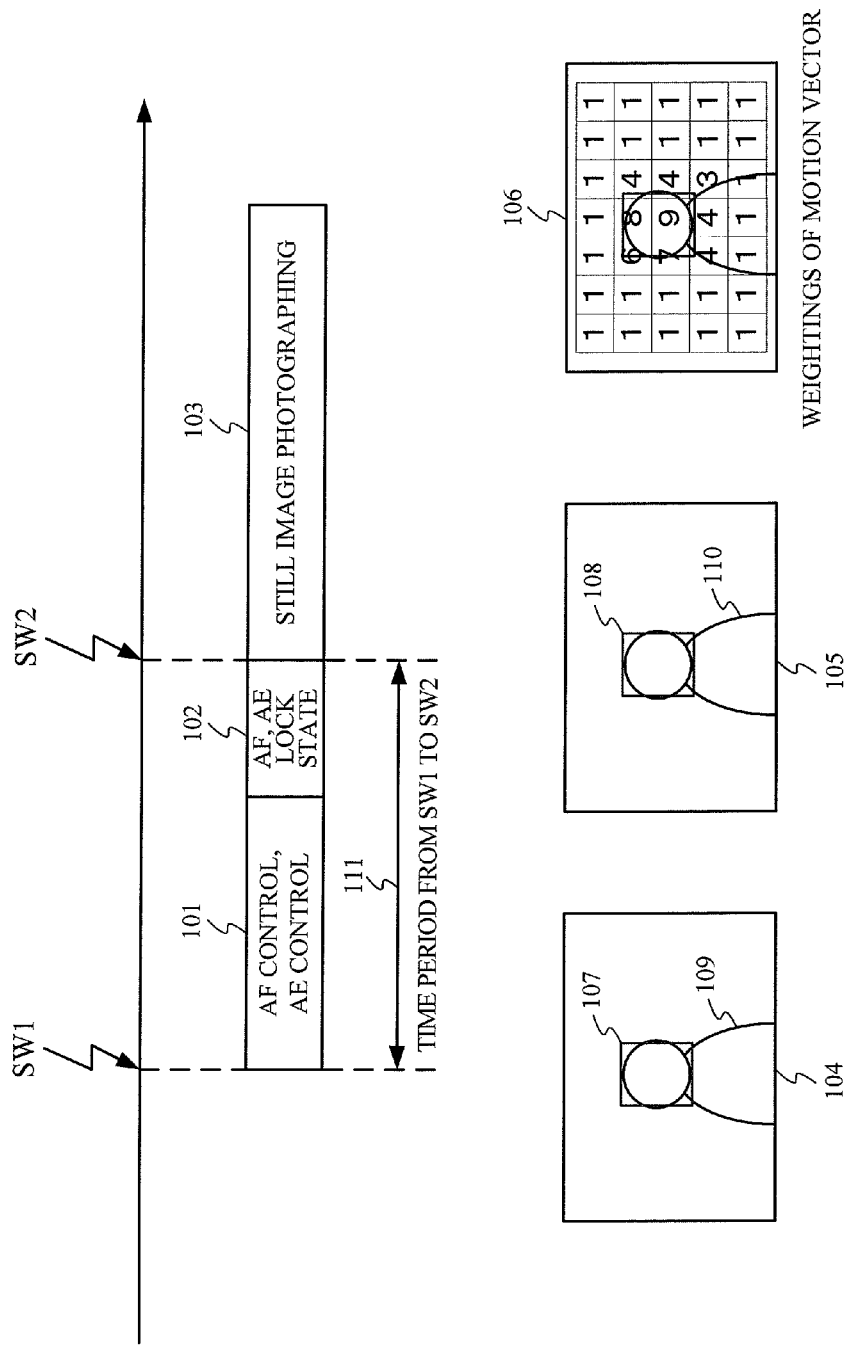
FIG. 1 is a diagram for describing a related art of a weighting table of a motion vector in the case where an elapsed time from the operation of a first shutter switch to the operation of a second shutter switch is short.
Figure 2:
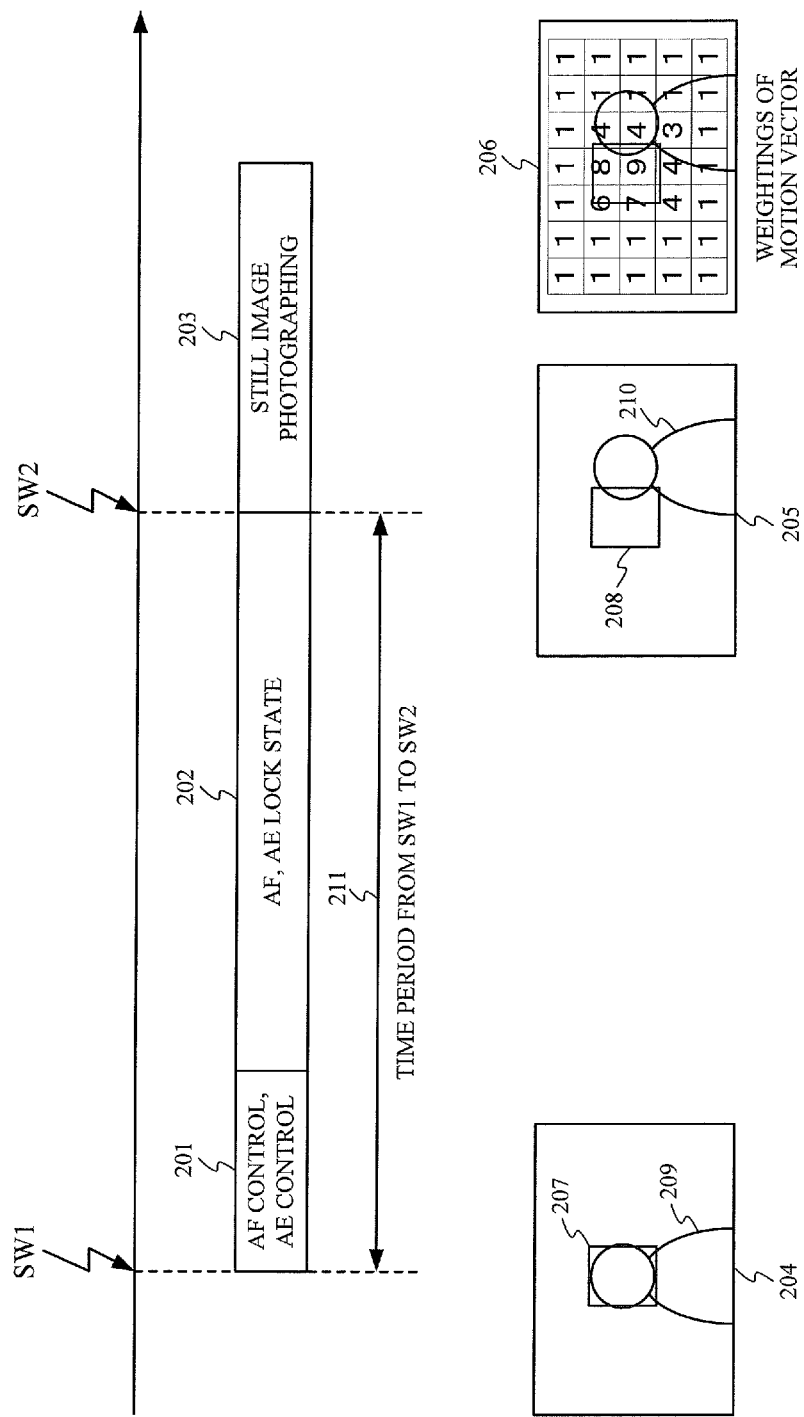
FIG. 2 is a diagram for describing a related art of a weighting table of a motion vector in the case where the elapsed time from the operation of the first shutter switch to the operation of the second shutter switch is long.
Figure 3:
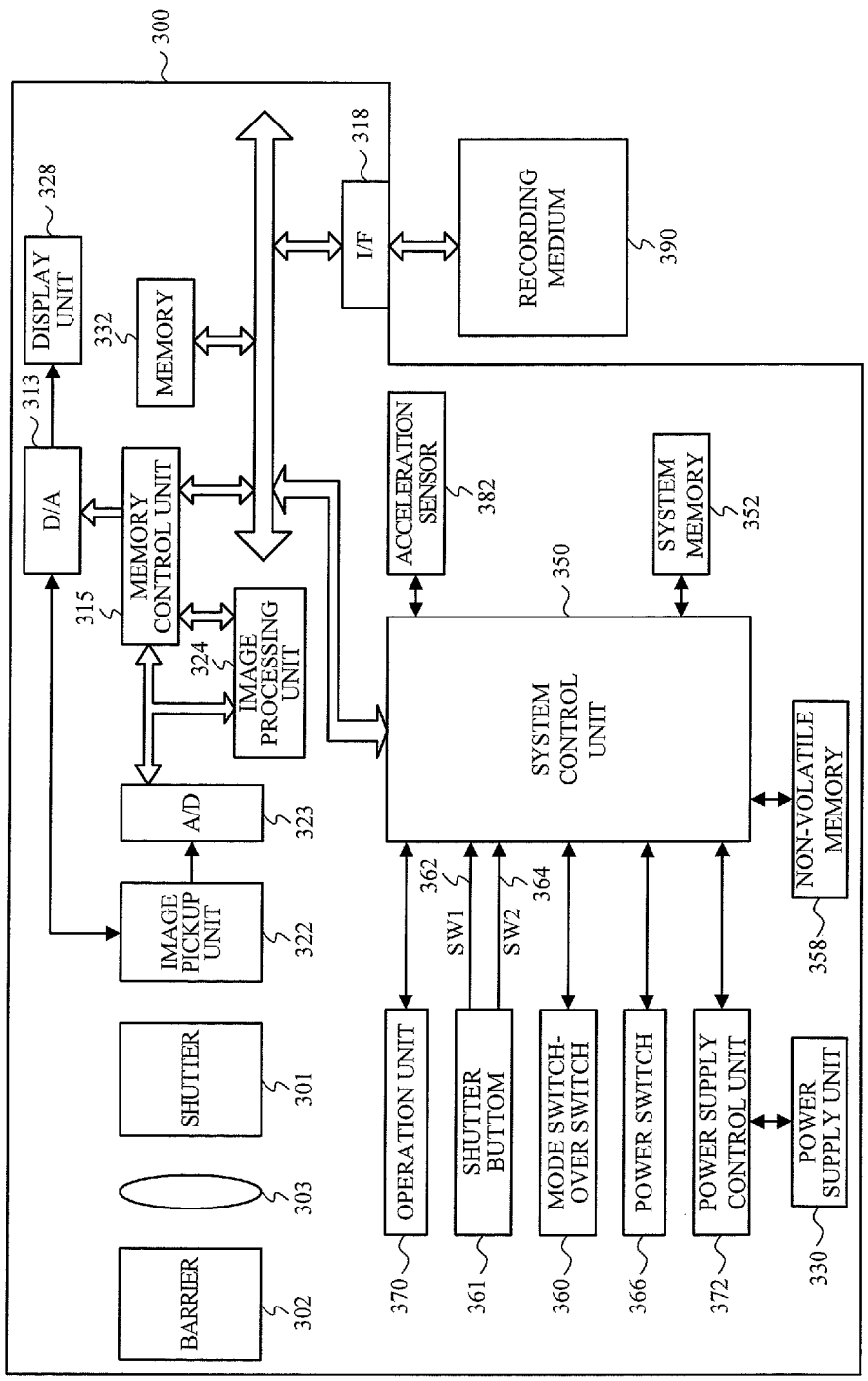
FIG. 3 is a block diagram of an image pickup apparatus having an image combining apparatus according to an embodiment of the invention.

FIG. 3 is a block diagram illustrating an example of a construction of an image pickup apparatus 300 to which an image combining apparatus of the invention is applied.

In FIG. 3, a photographing lens 303 includes a focus lens. A shutter 301 has an iris function. An image pickup unit 322 is constructed by a CCD, a CMOS element, or the like for converting an optical image into an electric signal. An A/D converter 323 converts an analog signal into a digital signal. The A/D converter 323 is used to convert an analog signal which is output from the image pickup unit 322 into a digital image signal. A barrier 302 covers the image pickup unit including the photographing lens 303 of the digital camera 300, thereby preventing a fouling or damage of an image pickup system including the photographing lens 303, shutter 301, and image pickup unit 322.

An image processing unit 324 executes image processings such as resizing processing such as predetermined pixel interpolation, reduction, or the like, color conversion processing, and the like to data from the A/D converter 323 or data from a memory control unit 315. The image processing unit 324 also executes a predetermined arithmetic operation processing to image data which is picked up under control of a system control unit 350. On the basis of an obtained arithmetic operation result, the system control unit 350 performs exposure control and distance measurement control. Thus, an AF (auto focus) processing, an AE (auto exposure) processing, and an EF (pre-flash light emission) processing of a TTL (Through The Lens) system are executed. The image processing unit 324 further executes a predetermined arithmetic operation processing by using the picked-up image data and also executes an AWB (auto white balance) processing of the TTL system on the basis of an obtained arithmetic operation result.

Output data from the A/D converter 323 is written into a memory 332 through the image processing unit 324 and memory control unit 315 or is directly written into the memory 332 through the memory control unit 315. The memory 332 stores the image data obtained by converting the data obtained by the image pickup unit 322 into the digital data by the A/D converter 323, and the image data to be displayed to the display unit 328. The memory 332 has a storage capacity enough to store a predetermined number of still images or a moving image and audio sound of a predetermined time.

The memory 332 is also used as a memory (video memory) for displaying an image. A D/A converter 313 converts the data for image display stored in the memory 332 into an analog signal and supplies to a display unit 328. The image data for display, written in the memory 332, is displayed by the display unit 328 through the D/A converter 313. The display unit 328 displays an image corresponding to the analog signal from the D/A converter 313 onto a display such as an LCD or the like.

A non-volatile memory 356 is an electrically erasable and recordable memory and, for example, an EEPROM or the like is used. Constants for operation of the system control unit 350, a program, and the like are stored into the non-volatile memory 356. The program mentioned here denotes a program which is loaded and executed by the system control unit 350 in order to execute various kinds of flowcharts, which will be described hereinafter in the present embodiment.

The system control unit 350 controls the whole digital camera 300. By executing the program recorded in the non-volatile memory 356 mentioned above, each processing in the present embodiment, which will be described hereinafter, is realized. A RAM is used as a system memory 352. The constants for the operation of the system control unit 350, variables, the program read out of the non-volatile memory 356, and the like are developed in the system memory 352. The system control unit also controls the display by controlling the memory 332, D/A converter 313, display unit 328, and the like.

An acceleration sensor 382 is a sensor which can detect whether or not a physical acceleration is applied to the digital camera 300, a direction of the acceleration, or the like. The acceleration sensor is properly controlled by the system control unit 350 and the detected information is properly handled by processings of the present embodiment, which will be described hereinafter.

A mode switch-over switch 360, a first shutter switch 362, a second shutter switch 364, and an operation unit 370 are operation units for inputting various kinds of operation instructions to the system control unit 350.

The mode switch-over switch 360 switches an operation mode of the system control unit 350 to any one of a still image recording mode, a moving image recording mode, a reproduction mode, and the like. The first shutter switch 362 is turned on during the operation, that is, in the half-depression state (photographing preparation instruction) of a shutter button 361 provided for the digital camera 300 and generates a first shutter switch signal SW1. By the first shutter switch signal SW1, the operations such as AF (auto focus) processing, AE (auto exposure) processing, AWB (auto white balance) processing, EF (pre-flash light emission) processing, and the like are started.

The second shutter switch 364 is turned on upon completion of the operation, that is, in the full-depression state (photographing instruction) of the shutter button 361 and generates a second shutter switch signal SW2. With the second shutter switch signal SW2, the system control unit 350 starts a series of photographing processing operations from the signal read-out from the image pickup unit 322 to the writing of the image data into a recording medium 390 in accordance with the program.

Operation members of the operation unit 370 function as various kinds of function buttons which are used for selecting various kinds of function icons displayed on the display unit 328 or the like to allocate a proper function every scene. As function buttons, for example, there are a stop button, a back button, an image-feed button, a jump button, a narrow-down button, an attribution-change button, and the like. For example, when a menu button is depressed, various kinds of settable menu screens are displayed to the display unit 328. By operating the menu screen displayed to the display unit 328 by using a four-direction operational button and a SET button, the user can intuitively make various kinds of settings.

A power supply control unit 372 is constructed with a battery detection circuit, a DC/DC converter, a switch circuit for switching over a circuit block to be energized, and the like and detects whether a battery is mounted or not, a type of a battery, and a residual battery capacity. On the basis of detection results and an instruction of the system control unit 350, the power supply control unit 372 controls the DC/DC converter and supplies a necessary voltage to each unit including the recording medium 390 for a necessary period of time.

A power supply unit 330 is constructed with a primary battery such as alkaline battery, lithium battery, or the like, a secondary battery such as NiCd battery, NiMH battery, Li battery, or the like, an AC adapter, and the like. An interface 318 to the recording medium 390 such as memory card, hard disk, or the like is provided. The recording medium 390 is a recording medium such as a memory card or the like and is constructed by a semiconductor memory, a magnetic disk, or the like.

How the image combining apparatus of the invention operates in the foregoing digital camera will be described hereinbelow. First, an outline of a photographing function will be described. Subsequently, the photographing processing will be described in detail. An image combination of the invention, particularly, a construction for obtaining information which is used for generation of a weighting table will be described.

In the foregoing digital camera 300, it is assumed that a photographing using a central one point AF or a face AF can be performed. The central one point AF denotes that the AF is performed to one point at the center position in a photographing image. The face AF denotes that the AF is performed to a face in the photographing display screen detected by a face detection function.

The face detection function associated with a setting of a detection area of a motion vector will be described here. The system control unit 350 sends image data to be subjected to the face detection to the image processing unit 324. Under control of the system control unit 350, the image processing unit 324 allows a horizontal-direction bandpass filter to act on the image data. Further, under control of the system control unit 350, the image processing unit 324 allows a vertical-direction bandpass filter to act on the processed image data. An edge component is detected from the image data by the horizontal- and vertical-direction bandpass filters.

After that, the system control unit 350 extracts candidate groups of an eye, a nose, a mouth, and an ear by a pattern matching to the detected edge component. The system control unit 350 selects the eyes which satisfy preset conditions (for example, a distance between the two eyes, an inclination, and the like) from the extracted candidate group of the eye, determines that the selected eyes as a pair of eyes, and narrows down only the eyes constructing the eye pair as a candidate group of the eye. The system control unit 350 makes the narrowed-down candidate group of the eye correspond to other parts (nose, mouth, ear) forming the face corresponding to the candidate group and allows a correspondence result to pass through a preset non-face condition filter, thereby detecting the face. The system control unit 350 outputs the face information in accordance with a detection result of the face and terminates the processing. At this time, feature amounts such as the number of faces and the like are stored into the memory 352.

As mentioned above, the image data which is displayed in live view or in reproduction is image-analyzed, the feature amounts of the image data are extracted, and object information can be detected (object area can be obtained). Although the face information has been mentioned as an example of the object information in the embodiment, as other information, there are various kinds of information which is obtained by a red eye decision, an eye detection, an eye-closing detection, a smile detection, and the like.

A face AE, a face FE, and a face WB can be performed simultaneously with the face AF. The face AE is an operation for optimizing an exposure of the whole display screen in accordance with brightness of the detected face. The face FE is an operation for performing a light emission modulation of a flash with respect to the detected face as a center. The face WB is an operation for optimizing a WB of the whole display screen in accordance with a color of the detected face.

In the foregoing digital camera 300, the area in the photographing image, detected by the face detection function, is used for detection of a motion vector. By using such a method, a tracking processing of the object by the face detection can be executed. In the case of time-sequentially and continuously picking up images such as images for display or the like, a detection of a motion vector is performed to object areas of a current frame and a frame image continuously preceding by one frame (one-continuous frame). A detection result is used as a movement amount of an object area and a position of the object area is successively corrected, thereby executing an object tracking processing. The motion vector amount is obtained by the system control unit 350 by using a correlation operation such as a block matching or the like to object area data of the current frame and one-preceding frame.

Figure 4:
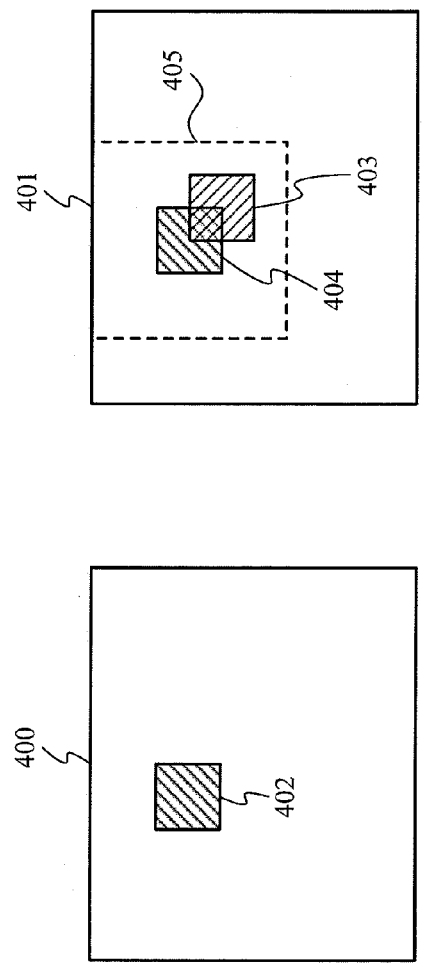
FIG. 4 is a diagram for explaining a block matching to detect a motion vector between images.

FIG. 4 illustrates an example of the block matching as an example of a correlation operation processing. In FIG. 4, a position where an image in a base block 402 of one image (400) of two images to be subjected to the block matching is most approximate (correlated) to an image in a search range 405 of the other image 401 is searched for. The most approximate position denotes a position where among results of an SAD arithmetic operation performed to all pixels in a rectangular area, the minimum thereof is obtained. An SAD value in the description denotes a Sum of Absolute Difference. A difference between coordinates of an image pickup position obtained by the search and coordinates of the base block 402 provides a motion vector.

The search is performed by the following procedure.

A target block 403 which is located inside of the search range 405 serving as a prescribed range centering around a projection image of a base block 404 located at a projection image position of the base block 402 of the image 400 is determined as a block which has the same size as that of the base block 402. The target block 403 and the base block 402 are respectively cut out and an SAD value thereof is obtained. SAD values are obtained with respect to all target blocks 403 which can exist inside of the search range 405. A position of the target block 403 in which the SAD value becomes minimum is obtained and is set as coordinates of the image pickup position. A difference between the coordinates of the image pickup position obtained here and the coordinates of the base block 402 provides a motion vector amount to be obtained.

FIG. 5 is a diagram for describing a relation between the photographing operation at the time of photographing a still image and a photographing processing. When the operator operates the first shutter switch 362, AF control (auto focus control) and AE control (auto exposure control) 501 is executed and, after photographing conditions are decided, an object lock 502 (AF lock, AE lock state) is set. Subsequently, when the operator operates the second shutter switch 364, a still image photographing 503 is executed. The object lock 502 (AF, AE lock state) is maintained until the second shutter switch 364 is operated by the operator. An elapsed time from the operation of the first shutter switch 362 at this time is shown by 511. A photographing angle of view at a point of time of the operation of the first shutter switch and the object lock 502 is shown by 504. An object 509 and a detected object area 507 are shown. The detected object area 507 is a main object area detected at the time of the AF control or AE control. For example, when the face is detected by the face detection processing, the face detection area becomes the main object area 507.

Figure 6A:
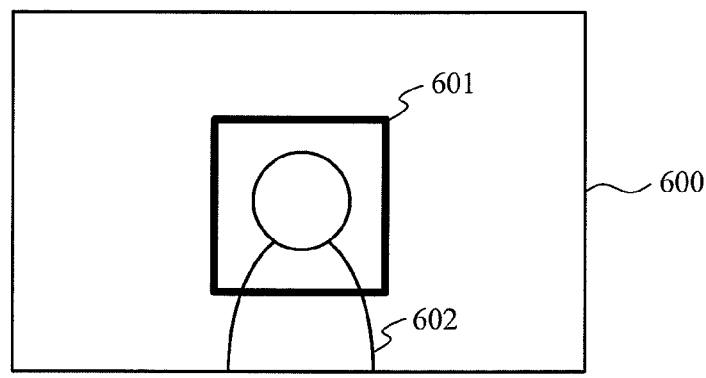
FIGS. 6A and 6B are diagrams for explaining a main object and a main object area.
Figure 6B:
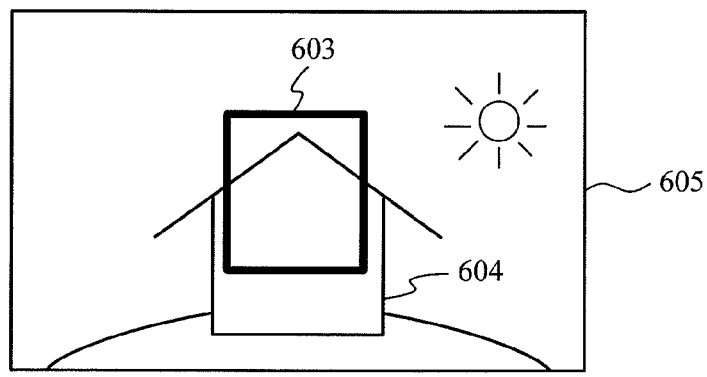

FIGS. 6A and 6B are diagrams for describing the main object area in the object lock.

FIG. 6A illustrates an example in which a face of a person 602 serving as an object is detected in a photographed image 600 by the face detection processing. An area where the face is detected is shown by 601. In this case, the face detection area 601 becomes the main object area. A position and a size of the face area, a position of the eye, a position of the mouth, an angle of the face, and the like are obtained as main object information.

FIG. 6B illustrates an example in which an object 604 is not a person. An in-focus area serving as a result of the AF processing of a photographed image 605 is shown by 603. In this case, the main object area becomes the in-focus area 603. A position and a size of the in-focus area are obtained as main object information.

Figure 7:
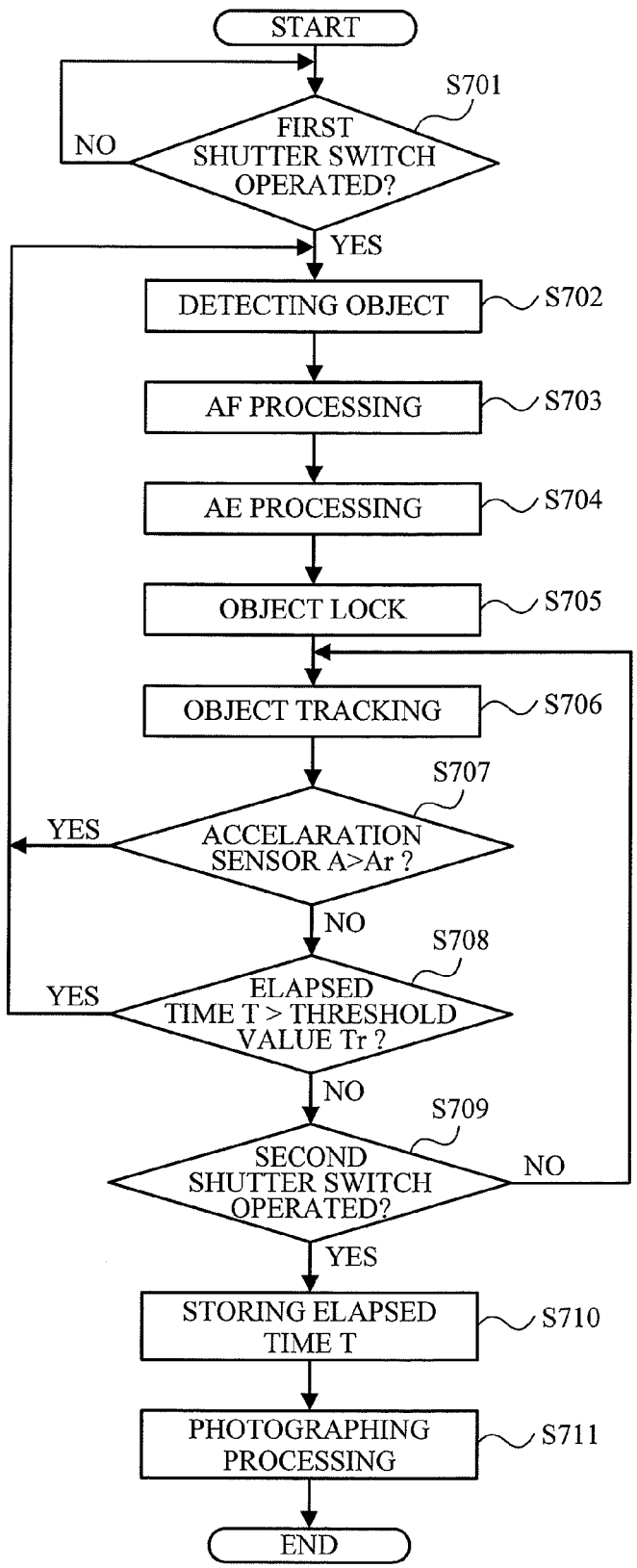
FIG. 7 is a flowchart for the photographing processing from the operation of the first shutter switch to the operation of the second shutter switch according to the invention.

FIG. 7 is a flowchart for explaining the still image photographing processing from the object lock by the operation of the first shutter switch 362 by the operator to the operation (photographing completion) of the second shutter switch 364 thereby. This processing is executed by the system control unit 350 on the basis of the program stored in the non-volatile memory 356.

In step S701, whether or not the first shutter switch 362 is operated is discriminated. If it is not operated, the processing routine is returned to step S701. If the first shutter switch 362 is operated, step S702 follows. Step S702 is an object detection processing. For example, features of the object such as a face and the like are detected. Thus, information of the position, size, features, and the like of the object is obtained. For example, if the face is detected by the face detection, information of the position and size of the face, the position of the eye, the position of the mouth, and the like is obtained. Subsequently, in step S703, the auto focus processing (AF processing) is executed. In the AF processing, for example, on the basis of the object information obtained in step S702, a main object image is specified and an in-focus processing is executed to this area. If the object cannot be detected, a spot AF processing or multi-point AF processing in which the in-focus processing is executed around a middle distance, for example, from one predetermined fixed area or a plurality of fixed areas. In next step S704, the auto exposure processing (AE processing) is executed. On the basis of the object position obtained by the object detection in S702 or the fixed area for the in-focus processing selected by the in-focus processing, exposure control is made so that the photographing can be performed with the proper exposure. Then, the processing routine advances to the object lock in step S705. The information of the object obtained by the object detection in S702 or the AF processing in step S703 or the like is stored into the system memory 352 together with the object lock time (current time). The in-focus state in the AF processing in step S703 and the proper exposure state in the AE processing in step S704 are held. Subsequently, in step S706, a tracking processing of the object captured by the object lock is executed. On the basis of the detection of the motion vector mentioned above, the object tracking processing in step S706 is executed to the main object area obtained by the object detection processing in step S702. For example, to the main object area of the continuous picked-up images of the current frame and one-preceding frame in the time sequence of the picked-up images for display, the motion vector is obtained by the motion vector detection processing using the SAD value. Subsequently, a position of the main object area is corrected by the obtained motion vector amount. Further, even if the main object area is moved on the continuous picked-up images for display, it can be tracked by repeating such a processing to the subsequent frames. In next step S707, whether or not an acceleration A higher than a certain acceleration Ar is detected by the acceleration sensor is discriminated. If the acceleration higher than Ar is detected, the processing routine advances to step S702 of the object detection. A series of processings such as object detection S702, AF processing S703, AE processing S704, and object lock S705 are executed again. If the acceleration higher than Ar is not detected, step S708 follows. In step S708, an elapsed time T as a difference between the object lock time stored in step S705 and the current time (elapsed time obtainment) is compared with a preset threshold value Tr (second time). If the elapsed time T exceeds the threshold value Tr, the processing routine advances to the object detection processing of step S702. A series of processings such as object detection S702, AF processing S703, AE processing S704, and object lock S705 are executed again. Therefore, the elapsed time T is also measured again and obtained. If the elapsed time T does not exceed the threshold value Tr, step S709 follows. In step S709, whether or not the second shutter switch 364 is operated is discriminated. If it is not operated, the processing routine is returned to the object tracking processing of step S706 and the object tracking processing is executed again. If the second shutter switch 364 is operated, step S710 follows. In step S710, the elapsed time T as a difference between the time when the second shutter switch 364 is operated and the object lock time is stored into the system memory 352. Step S711 is the photographing processing and the image obtained through the image pickup unit 322 as mentioned above is written into the memory 332. In the case of the photographing in which images are combined, the photographing processing is continuously executed a plurality of times and a plurality of photographed images are stored into the memory 332. For example, if the photographing processing is continuously executed N times in order to combine N images, N image data is stored into the memory 332.

Figure 8:
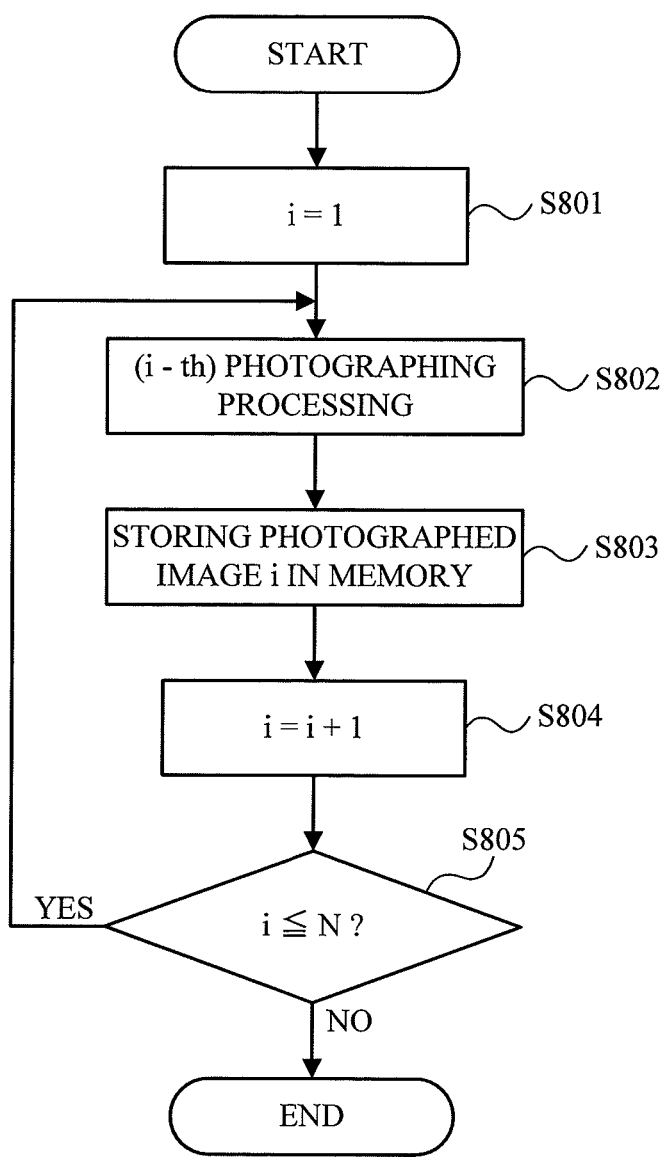
FIG. 8 is a flowchart for photographing a plurality of images to be combined.

FIG. 8 is a flowchart for the photographing processing in step S711 in the case of combining a plurality of photographed images. N indicates the number of continuous photographings. The photographing processing is continuously executed N times in order to combine N images.

In step S801, i is initialized to 1 (i=1), where i denotes a count value of the number of photographings. Subsequently, step S802 follows. In step S802, the photographing processing is executed. Step S802 is the photographing processing of the i-th one image. As mentioned above, the image data is obtained through the image pickup unit 322 or the like. Then, step S803 follows. In step S803, the image data obtained by the photographing processing of S802 is stored as i-th image data into the memory 332. Then, step S804 follows. In step S804, 1 is added to the number i of photographings and step S805 follows. In step S805, whether or not the number of photographings is equal to or less than N is discriminated. If it is equal to or less than N, the processing routine is returned to the photographing processing of step S802. If i is larger than N, a series of photographing processings are terminated. In this manner, the photographing is continuously executed N times and N image data is obtained and stored into the memory 332.

Figure 10:
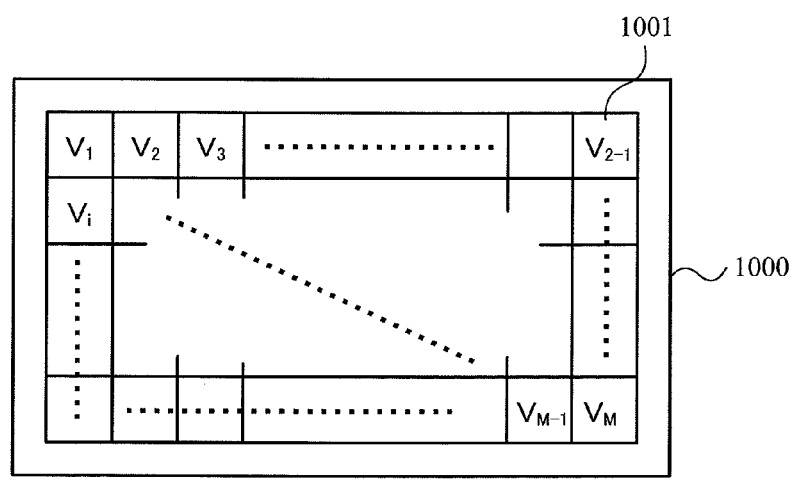
FIG. 10 is a diagram for explaining a block serving as a detection area of a motion vector.
Figure 11:
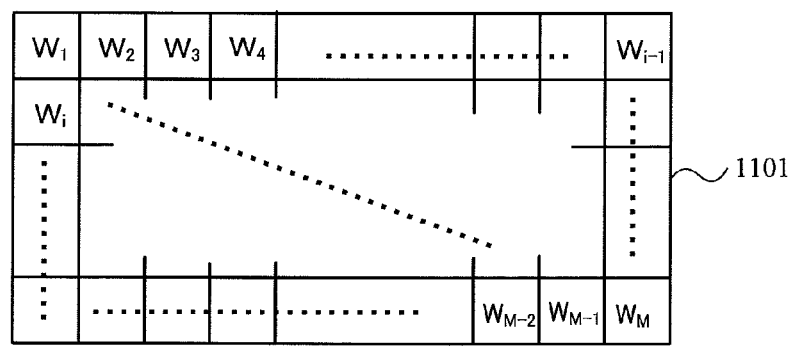
FIG. 11 is a diagram for explaining a construction of a weighting table of a motion vector.

Subsequently, the image combining processing of the invention will be described with reference to FIGS. 9 to 11.

Figure 9:
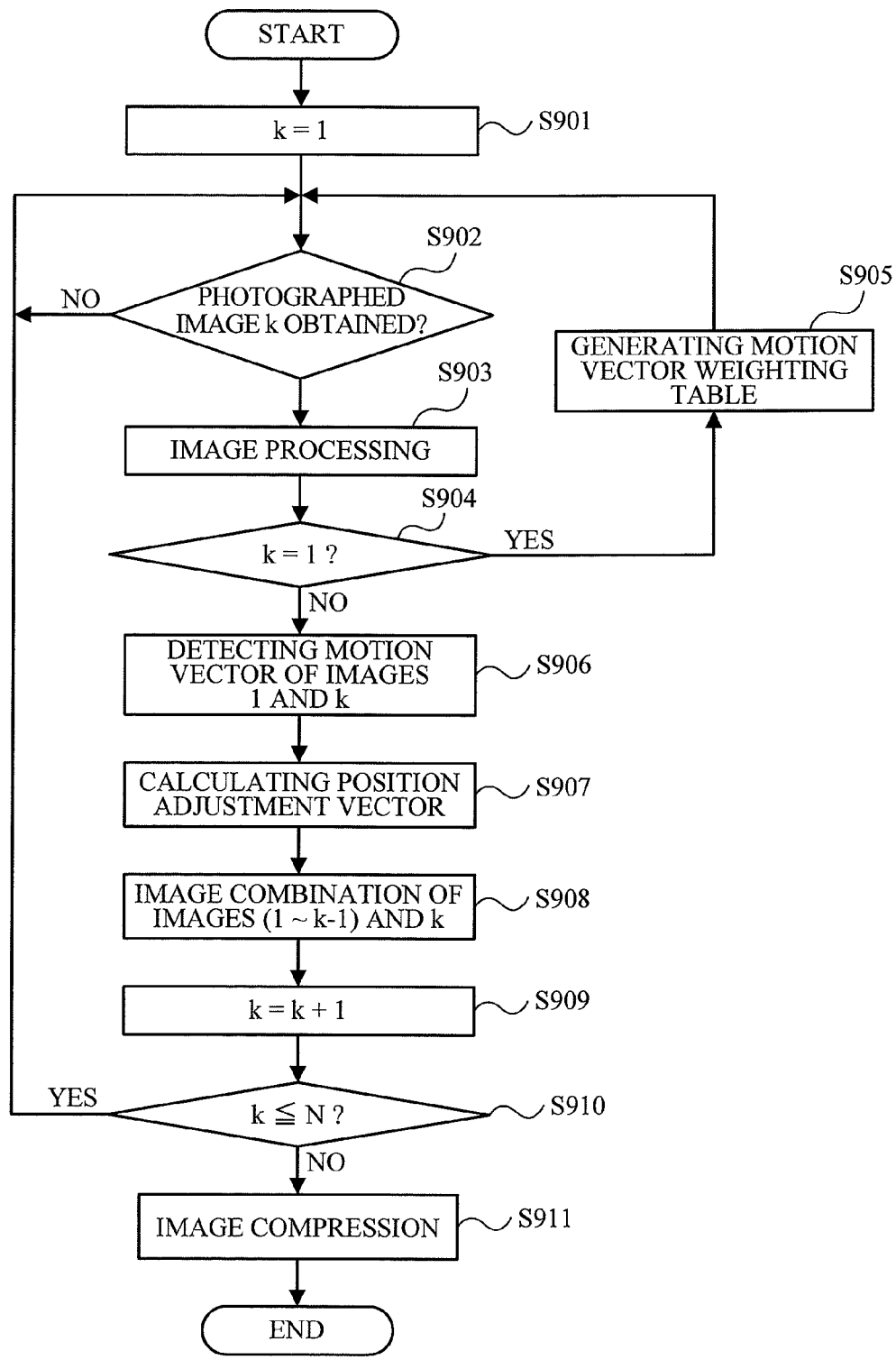
FIG. 9 is a flowchart for a combining processing of a plurality of photographed images.

FIG. 9 is a flowchart for the image combining processing for generating one image data by combining N image data stored in the memory 332. FIG. 10 is a diagram illustrating a detection area in the motion vector detecting step S306 in the embodiment. A photographed image 1000 is divided into M block areas 1001 (1 to M) and the motion vector detection is performed to each area. For example, a motion vector serving as a positional difference between an image 1 and an image k is obtained as M motion vectors Vm (m=1 to M). FIG. 11 is a diagram illustrating a weighting table of a motion vector. A weighting table 1101 of a motion vector is constructed by M weights Wi. They correspond to the M motion vector detection areas 1001 in FIG. 10, respectively. Therefore, the weightings of the motion vectors are managed by the weights Wi (=1 to M).

Referring to FIG. 9, in the image combining processing of the invention, first, in step S901, the number k of images to be processed is initialized to 1 (k=1). Subsequently, in step S902, whether or not the k-th photographed image data is stored in the memory 332 is confirmed. If the k-th image data is not stored in the memory 332, the processing routine is returned to step S902. If the k-th image data is stored in the memory 332, step S903 follows. In step S903, the obtained image data is image-processed. This processing is the foregoing processing which is executed by the image processing unit 324. In next step S904, whether or not the number k of photographed images is equal to 1 is discriminated. If k=1 and the photographed image is the first image, step S905 follows. If k≠1, step S906 follows. In step S905, weighting tables Wm (m=1 to M) of a motion vector are generated. A processing in this instance will be described in detail hereinafter. The weighting tables of the motion vector are used in a calculation of a position adjustment vector of step S907 together with the detected motion vector. In step S906, a motion vector is detected. A positional difference between the first image data and the k-th image data is obtained as motion vectors Vm. At this time, the image is divided into areas and motion vectors Vm (m=1 to M) are obtained every image area. Subsequently, in step S907, a position adjustment vector is calculated. A position adjustment vector VC is calculated from the motion vectors Vm (m=1 to M) detected in step S906 and the motion vector weighting tables generated in step S905. In next step S908, the image combining processing of combination images (1 to k−1) and the image k is performed by correcting the positional difference on the basis of the calculated vector VC. The image combining processing in this instance will be described in detail hereinafter. The correction of the positional difference is made by, for example, a combination processing (affine transformation processing) of a rotation and a parallel movement of the image. Subsequently, in step S909, 1 is added to the number k of photographings (k=k+1). In next step S910, k is compared with the number N of photographings. If k is equal to or less than N, the processing routine is returned to step S902. If k is larger than N, this means that the image combining processing of N images is executed. A series of image combining processings are finished. In next step S911, a compression processing of the combined image is executed.

Step S905 of generating the weighting table of the motion vector will be described in detail hereinbelow with reference to FIGS. 12 to 14.

First, a generation of fundamental tables serving as sources of generation of the weighting tables Wi will be described. The motion vector weighting table of the invention is generated in accordance with the elapsed time T stored upon photographing by using motion vector weighting fundamental tables generated on the basis of the main object area.

Figure 12:
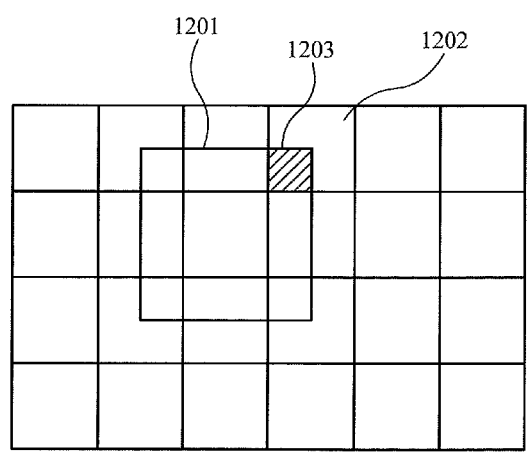
FIG. 12 is a diagram for explaining a generation of a fundamental table of weightings.

FIG. 12 is a diagram for describing step S905 of generating the weighting fundamental tables of the motion vector. In the diagram, a main object area 1201 is illustrated. The face detection area 601 and the in-focus area 603 in FIGS. 6A and 6B are defined as main object areas. A motion vector detection area 1202 is one of a plurality of block areas. Reference numeral 1203 denotes a portion of the main object area 1201, which portion occupies a portion of one motion vector detection area 1202. For example, fundamental tables BWi (i=1 to M) of the weighting are generated by obtaining fundamental weightings BWi from a ratio of the portion of the main object area 1203, which portion occupies a portion of the detection area 1202. At this time, each weighting BWi is obtained by the following equation (1).

$$BWi = BW0 + K \times Si \tag{1}$$

where, BW0 denotes a minimum weighting value, K denotes a weighting coefficient, and Si denotes a ratio of the portion of the main object area 1203, which portion occupies a portion of the area of the detection area 1202. That is, the more the block includes the objects, the larger the fundamental weighting becomes.

Subsequently, the weighting tables Wi (i=1 to M) are obtained from the motion vector weighting tables BWi (i=1 to M). The weightings Wi of the motion vector are obtained by the following equation (2).

$$Wi = (WA - BWi) \times T/T0 + BWi(T < T0) \text{ or} \tag{2}$$
$$= WA(T \geq T0)$$

where, T denotes the elapsed time obtained in step S710 of storing the elapsed time T, T0 denotes the elapsed time until the weighting tables become a total average, and T0 is preset on the basis of photographing conditions as will be described hereinafter (first time). When T≥T0, Wi=WA and the weighting tables Wi (1 to M) become the total average. WA denotes an average weighting value. BWi denotes fundamental weightings of the fundamental tables.

T0 will now be described. T0 is a value which is determined and set by the photographing conditions which are decided by the features of the object, the photographing mode, the AE processing, and the like. The obtainment of the information such as features of the object and the like and the setting of T0 are performed under control of the system control unit 350.

An example of T0 which is set is illustrated in FIG. 13. T0 is decided on the basis of whether or not the main object is detected as a person/face, the number of in-focus areas by the AF processing, whether or not the photographing mode is one of a portrait, a night scene, a landscape, sports, and the like, and a Tv value which is determined by a shutter speed as an AE processing result. T0 is obtained by each expression shown in FIG. 13. As already described above, N denotes the number of images to be combined and K denotes the weighting coefficient.

Figure 14:
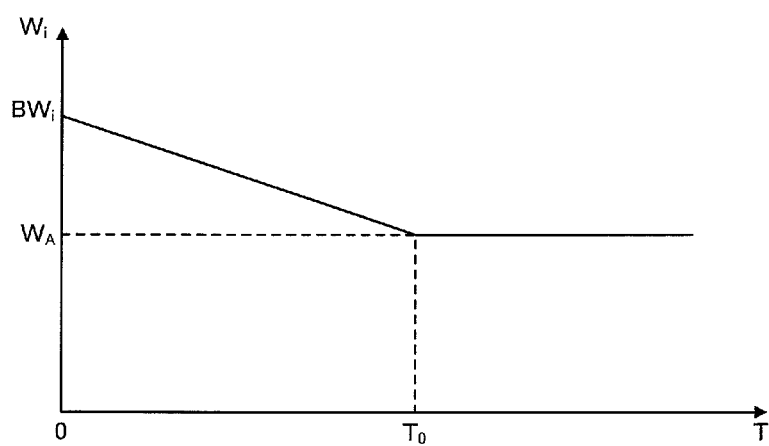
FIG. 14 is a diagram illustrating a relation between an elapsed time T and a weight Wi.

FIG. 14 is a graph illustrating a relation between the elapsed time T which is expressed by the equation (2) and the weight Wi. When T=0, Wi=BWi. When the time elapses, Wi approaches WA and when T=T0, Wi=WA. It will be understood that when T≥T0, Wi=WA. That is, when the time elapses, the weightings are changed from the fundamental weightings BWi to a fixed weighting defined by WA. The fixed weighting WA is defined by, for example, the total average weighting in which all Wi are equal. Or, the fixed weighting WA is defined by a center-priority weight in which the weight Wi has a center-priority value which is slightly larger at a center area than that at a peripheral area.

Subsequently, step S907 of calculating a position adjustment vector will be described. A position adjustment vector VC is obtained from motion vectors Vi detected every block and the motion vector weightings Wi. The position adjustment vector VC is expressed by the following equation (3).

$$VC = \frac{\sum_{i=1}^{M} Wi \cdot Vi}{\sum_{i=1}^{M} Wi} \quad (3)$$

Figure 15:
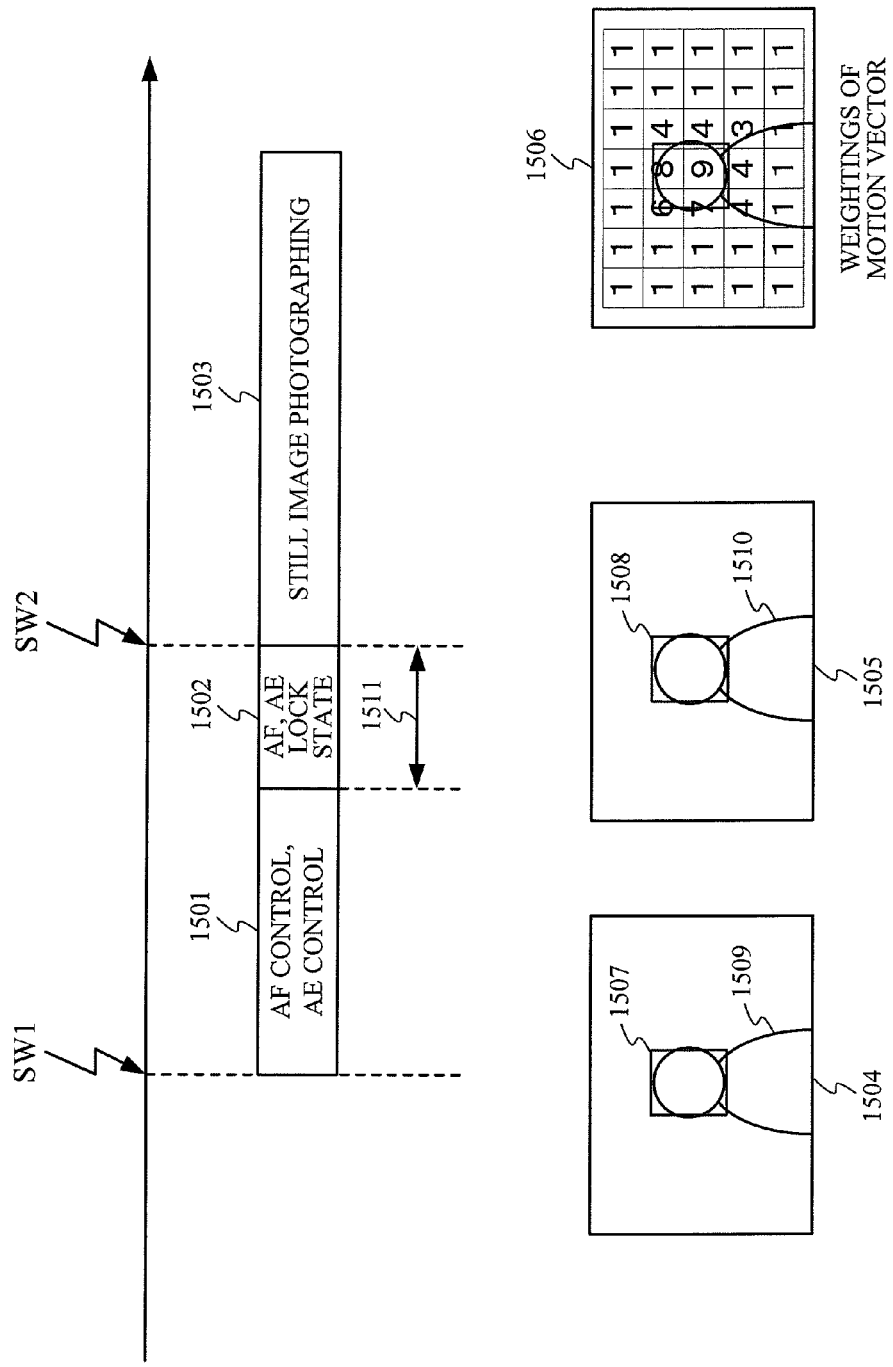
FIG. 15 is a diagram for explaining a weighting table according to the invention which is generated in the case where the elapsed time from the operation of the first shutter switch to the operation of the second shutter switch is short.
Figure 16:
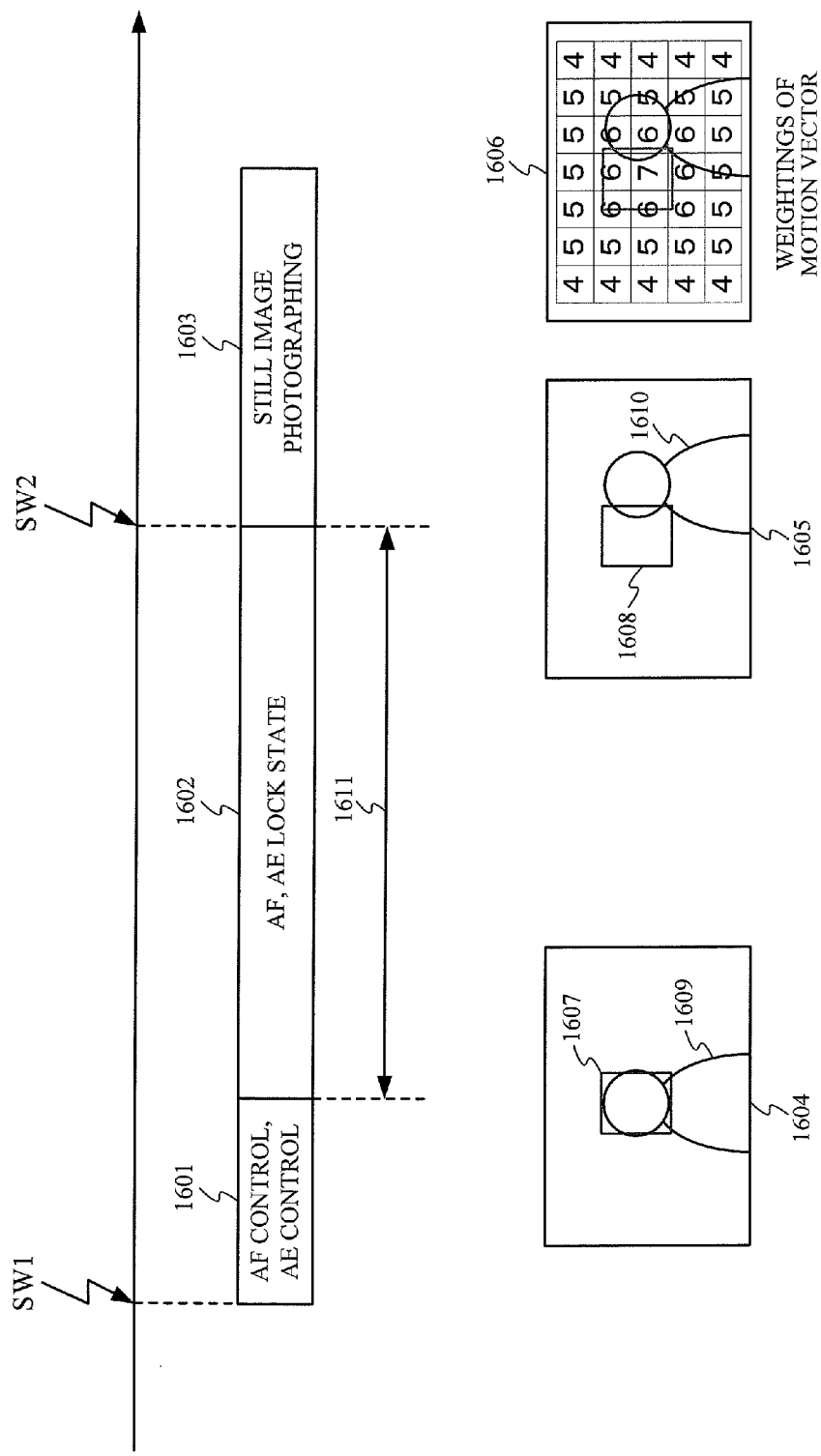
FIG. 16 is a diagram for explaining an example of a weighting table of the invention which is generated in the case where the elapsed time from the operation of the first shutter switch to the operation of the second shutter switch is long.

FIGS. 15, 16, and 17 are diagrams each for describing an example of weightings of the motion vector which is generated by the invention.

When the operator operates the first shutter switch 362, AF control and AE control (1501, 1601, 1701) are performed and an object lock (1502, 1602, 1702) (AF, AE lock state) is obtained. Subsequently, when the operator operates the second shutter switch 364, a still image photographing (1503, 1603, 1703) is performed. An elapsed time from the object lock at this time is shown by (1511, 1611, 1711). A photographing angle of view at a point of time of the object lock is denoted with the numerals 1504, 1604 and 1704. An object (1509, 1609, 1709) and a detected object area (1507, 1607, 1707) are illustrated. The detected object area (1507, 1607, 1707) is, for example, a main object area detected at the time of the AF control or AE control. A photographing angle of view at a point of time of the object lock (1502, 1602, 1702) and the operation of the second shutter switch 364 is denoted with the numerals 1505, 1605 and 1705. An actual object at this time is denoted with the numerals 1510, 1610 and 1710 and a detected object area is denoted with the numerals 1508, 1608 and 1708. A weighting table of the position adjustment motion vector at the time of combination is denoted with the numerals 1506, 1606 and 1706. In the table, the larger a numeral in an area is, the larger the weighting of the motion vector in this area becomes, while the smaller the numeral is, the smaller the weighting becomes.

In the case of FIG. 15, since the elapsed time 1511 from the object lock is short, there is no positional difference between the actual object 1510 and the main object area 1508 as shown by 1505. Even if there is a positional difference, it is considered that such a difference is small. Therefore, the weighting table 1506 of the position adjustment motion vector is generated in such a manner that a position of the large weight and a position of the actual object 1510 coincide.

When the elapsed time 1611 from the object lock becomes long as illustrated in FIG. 16, a ratio between the weight of the weighting block of the main object area 1608 and the weight of the block around the object in the case of the weighting table 1606 of the position adjustment motion vector is smaller than that in the case of the weighting table 1506 of the position adjustment motion vector. When the elapsed time 1611 from the object lock becomes long, there is a case where a positional difference occurs between the actual object 1610 and the main object area 1608 as shown by 1605. However, even in such a case, since a weight of the main object area is small, a degree of influence at the time of calculating the position adjustment vector VC can be reduced.

Further, when the elapsed time 1711 from the object lock becomes long as illustrated in FIG. 17, a ratio between the weight of the weighting block including the main object area 1708 and the weight of the peripheral block of the object in the case of the weighting table 1706 of the position adjustment motion vector decreases more and more. When the time period of T0 elapses, the weights are averaged over all the blocks.

Although the invention is described above with respect to the case where the fixed weight WA is set in the total average weighting as an example, the invention can be also similarly applied to a case where it is set in the center-priority weighting, or the like.

Although the invention is described above with respect to the case where the point of time of the object lock is set as the base point of the elapsed time in FIGS. 15, 16, and 17, a case where the detection of the object (step S702 in FIG. 7) is set as the base point of the elapsed time can be also similarly described. In this case, when the elapsed time T from the detection of the object exceeds the predetermined period of time Tr, by executing again the object detection, AF processing, AE processing, and object lock to hold and start those information and by measuring the elapsed time T again, the invention can be attained in the similar manner. However, the period of time Tr is re-set.

Further, even if the object tracking was performed, there is a case where the difference between the object and the main object area is accumulated and increases gradually as the elapsed time becomes long. Therefore, even in such a case, when the elapsed time T in which the detection of the object is set as the base point exceeds a certain period of time Tr, by executing again the object detection, AF processing, AE processing, and object lock to hold and start those information and by measuring the elapsed time T again, the invention can be attained in the similar manner.

As mentioned above, according to the invention, even if the elapsed time after the object information is obtained is long, the weighting of the proper motion vector can be performed to the object with minimum processing load and electric power consumption and a precision of the vector for image combination can be raised, so that picture quality of the combined image can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-130169, filed Jun. 10, 2011, which is hereby incorporated by reference herein in its entirety.

What is claimed is:

1. An image combining apparatus for combining a plurality of photographed images by adjusting positions thereof in accordance with a position adjustment vector, comprising:
    an object area obtaining unit configured to obtain information of an object area images to be photographed;
    a preparation operation control unit configured to execute a preparation operation preceding to the photographing on the basis of the information obtained by the object area obtaining unit;
    an elapsed time obtaining unit configured to measure and obtain an elapsed time from the preparation operation executed by the preparation operation control unit to a photographing instruction;
    a motion vector detection unit configured to divide each of the photographed images into a plurality of areas and detect a motion vector of each of the divided areas;
    a motion vector weighting unit configured to weight the detected motion vector by using the elapsed time and the information of the object area; and
    a position adjustment vector calculation unit configured to calculate the position adjustment vector by using the weighted motion vector.

2. An apparatus according to claim 1, wherein the motion vector weighting unit compares the obtained elapsed time with a predetermined first time and changes a weight by the motion vector weighting unit in accordance with a result of the comparison.

3. An apparatus according to claim 2, further comprising a setting unit configured to set the first time, and wherein the setting unit obtains photographing modes of the plurality of images and information of features of the object which is photographed, and decides the first time in accordance with the obtained photographing modes and the obtained information of the features of the object.

4. An apparatus according to claim 1, wherein the preparation operation preceding to the photographing is an AF lock operation.

5. An apparatus according to claim 1, wherein the preparation operation preceding to the photographing is an AE lock operation.

6. An apparatus according to claim 1, wherein when the elapsed time measured by the elapsed time obtaining unit is longer than a predetermined second time, the object area obtaining unit obtains the information of the object area again.

7. An apparatus according to claim 1, further comprising an acceleration sensor, and wherein when the acceleration sensor detects an acceleration larger than a predetermined acceleration, the object area obtaining unit obtains the information of the object area again.

8. A control method of an image combining apparatus for combining a plurality of photographed images by adjusting positions thereof in accordance with a position adjustment vector, comprising:
    an object area obtaining step of obtaining information of an object area the images to be photographed;
    a preparation operation control step of executing a preparation operation preceding to the photographing on the basis of the information obtained in the object area obtaining step;
    an elapsed time obtaining step of measuring and obtaining an elapsed time from the preparation operation executed in the preparation operation control step to a photographing instruction;
    a motion vector detection step of dividing each of the photographed images into a plurality of areas and detecting a motion vector of each of the divided areas;
    a motion vector weighting step of weighting the detected motion vector by using the elapsed time and the information of the object area; and
    a position adjustment vector calculation step of calculating the position adjustment vector by using the weighted motion vector.

9. A non-transitory computer-readable storage medium storing a program comprising a program code for causing a computer to execute the control method according to claim 8.

* * * * *